(12) United States Patent
Diaz Caceres et al.

(10) Patent No.: US 11,188,828 B2
(45) Date of Patent: Nov. 30, 2021

(54) SET-CENTRIC SEMANTIC EMBEDDING

(71) Applicant: International Business Machines Corporation, Armonk, NY (US)

(72) Inventors: Gonzalo Ignacio Diaz Caceres, Oxford (GB); Achille Belly Fokoue-Nkoutche, Yorktown Heights, NY (US); Mohammad Sadoghi Hamedani, Yorktown Heights, NY (US); Oktie Hassanzadeh, Yorktown Heights, NY (US); Mariano Rodriguez Muro, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 924 days.

(21) Appl. No.: 15/420,971

(22) Filed: Jan. 31, 2017

(65) Prior Publication Data

US 2018/0218265 A1  Aug. 2, 2018

(51) Int. Cl.
   *G06N 5/02* (2006.01)
(52) U.S. Cl.
   CPC ...................... *G06N 5/02* (2013.01)
(58) Field of Classification Search
   CPC ...................................... G06N 5/02
   See application file for complete search history.

(56) References Cited

U.S. PATENT DOCUMENTS 8,190,422 B2 * 5/2012 Ascoli .................. G06F 40/242
                                                       704/9

OTHER PUBLICATIONS

Liu, An Improved Hyper-sphere Support Vector Machine (Year: 2007).*
Chen, Parameter Selection for Sub-hyper-sphere Support Vector Machine (Year: 2007).*
Pannu, AAD: Adaptive Anomaly Detection System for Cloud Computing Infrastructures (Year: 2012).*
Manuja, Semantic Web Mining of Unstructured Data (Year: 2014).*
Mel, et al. "The NIST Definition of Cloud Computing". Recommendations of the National Institute of Standards and Technology. Nov. 16, 2015.

* cited by examiner

*Primary Examiner* — Li B. Zhen
*Assistant Examiner* — Tewodros E Mengistu
(74) *Attorney, Agent, or Firm* — Vazken Alexanian; McGinn I.P. Law Group, PLLC.

(57) ABSTRACT

A semantic embedding model using geometrical set-centric approach to capture both ABox and TBox representational models is disclosed. The model transforms a semantic-rich knowledge graph into a set of overlapping, disjoint, and/or subsumed n-dimensional spheres that captures and represents semantics embedded in the knowledge graph.

14 Claims, 5 Drawing Sheets

(Cont'd)

SET-CENTRIC SEMANTIC EMBEDDING

BACKGROUND

The present invention relates generally to semantic embedding, and more particularly, but not by way of limitation, relates to a semantic embedding model that can transforms a knowledge graph into a set of n-dimensional spheres that represent semantics embedded in the knowledge graph.

SUMMARY

In an exemplary embodiment, the present invention can provide a computer-implemented method, including transforming a knowledge graph into a set of n-dimensional spheres to capture and represent semantics embedded in the knowledge graph and learning a model by assigning a position to n-dimensional points in the n-dimensional spheres such that the model reflects assigned n-dimensional points.

One or more other exemplary embodiments include a computer program product and a system. The above summary will be described in more detail below with reference to the drawings. The invention is capable of embodiments in addition to those described and of being practiced and carried out in various ways. It is thus to be understood that the invention is not limited in its application to the details of construction and to the arrangements of the components set forth in the following description or illustrated in the drawings. Also, it is to be understood that the phraseology and terminology employed herein, as well as the abstract, are for the purpose of description and should not be regarded as limiting.

As such, those skilled in the art will appreciate that the present invention may readily be utilized as a basis for the designing of other structures, methods and systems for carrying out the several purposes of the present invention. It is important, therefore, that the claims appended hereto be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
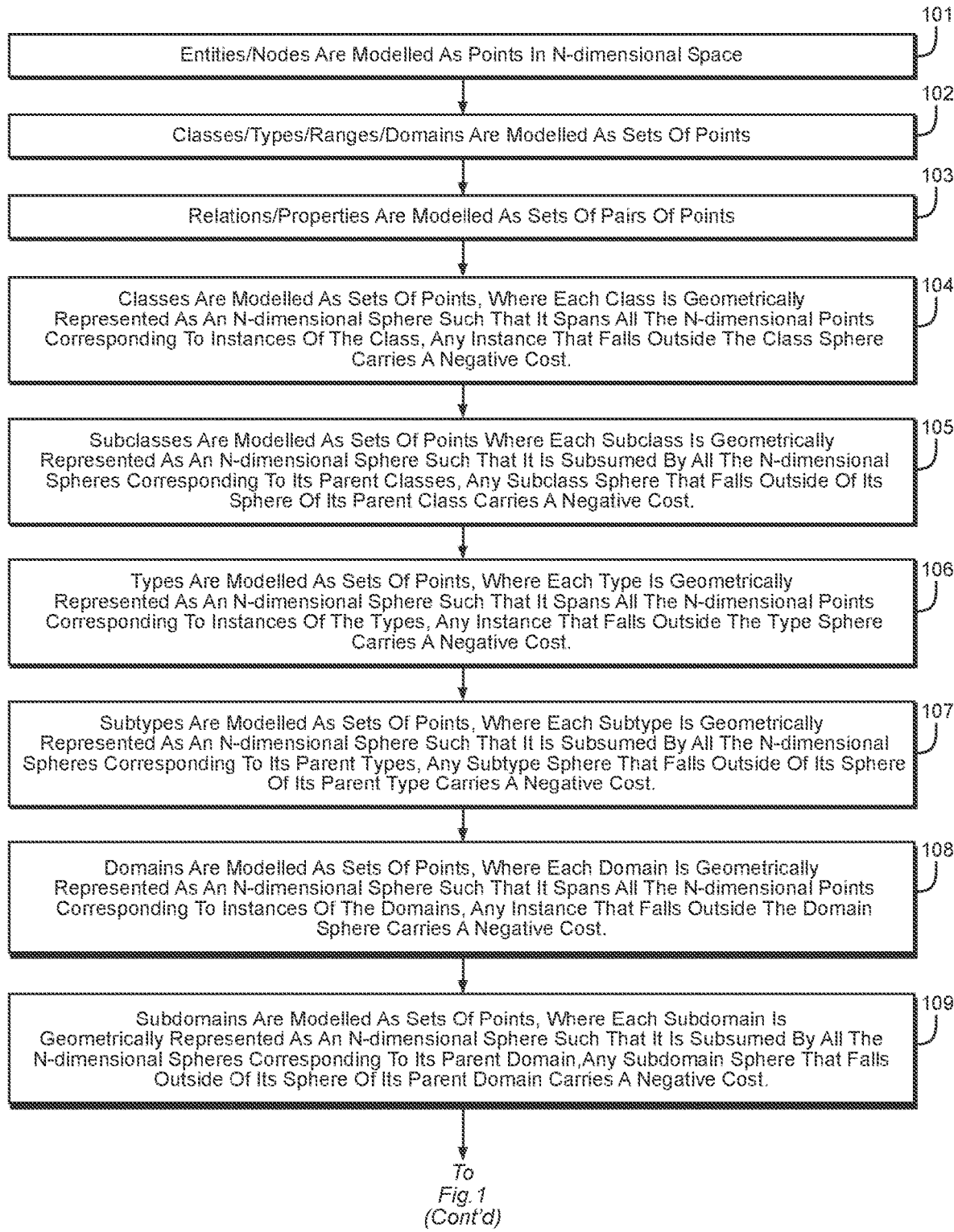
FIG. 1 exemplarily shows a high-level flow chart for a semantic embedding method 100 according to an embodiment of the present invention.
Figure 1:
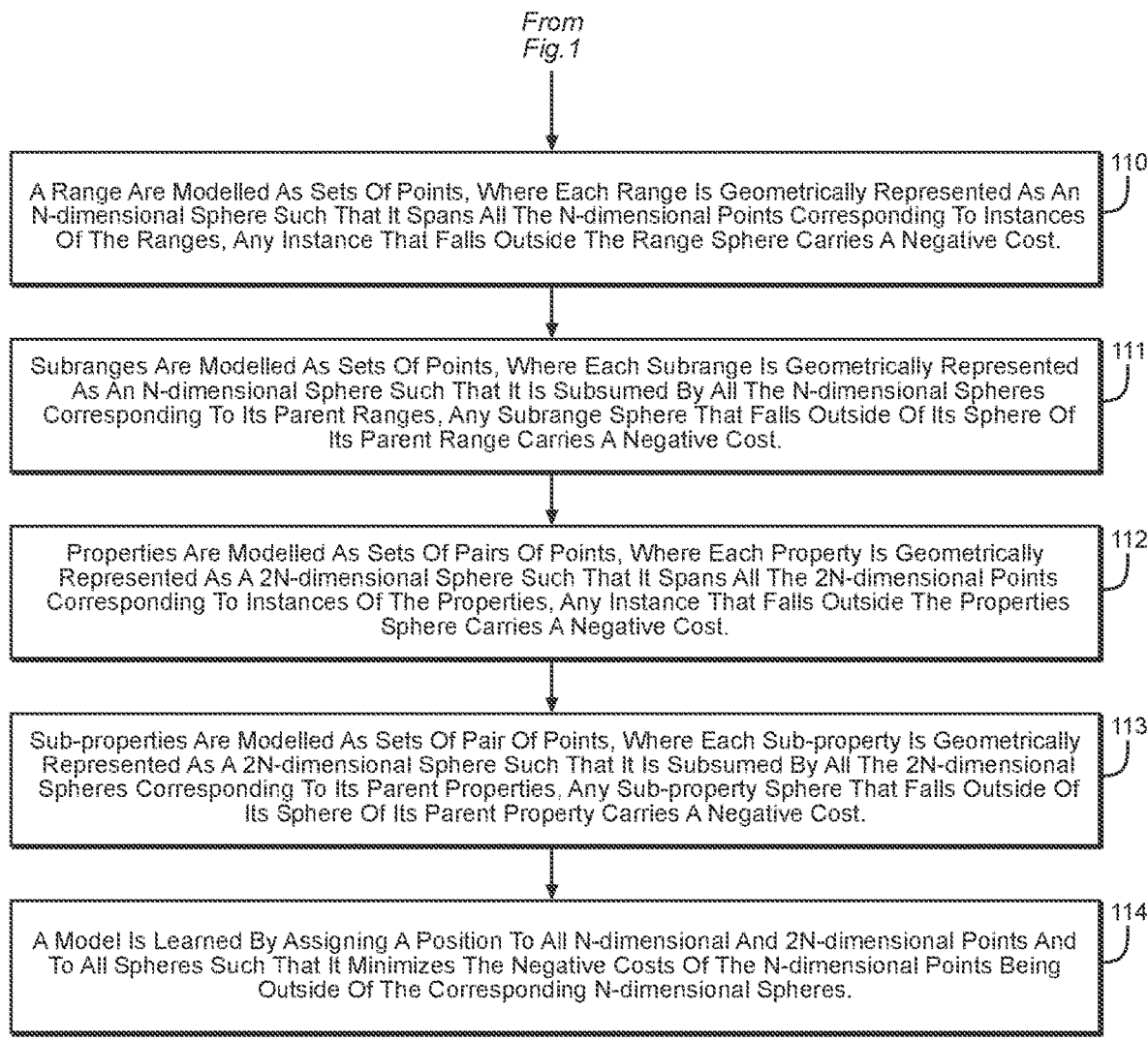

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Referring now to FIG. 1, in step 101, entities/nodes are modelled as points in n-dimensional space and classes/types/ranges/domains are modelled as sets of points in step 102 (i.e., as sphere in n-dimensional space). In step 103, relations/properties are modelled as sets of pairs of points (i.e., as a sphere in 2n-dimensional space) and, in step 104, classes are modelled as sets of points, where each class is geometrically represented as an n-dimensional sphere such that it (approximately) spans all the n-dimensional points corresponding to instances (entities/nodes) of the class. Any instance that falls outside the class sphere carries a negative cost (i.e., a penalty).

In step 105, subclasses are modelled as sets of points where each subclass is geometrically represented as an n-dimensional sphere such that it is (approximately) subsumed by all the n-dimensional spheres corresponding to its parent classes. Any subclass sphere that falls outside of its sphere of its parent class carries a negative cost (i.e., a penalty).

In step 106, types are modelled as sets of points, where each type is geometrically represented as an n-dimensional sphere such that it (approximately) spans all the n-dimensional points corresponding to instances (i.e., entities/nodes) of the types. Any instance that falls outside the type sphere carries a negative cost (i.e., a penalty).

In step 107, subtypes are modelled as sets of points, where each subtype is geometrically represented as an n-dimensional sphere such that it is (approximately) subsumed by all the n-dimensional spheres corresponding to its parent types. Any subtype sphere that falls outside of its sphere of its parent type carries a negative cost (i.e., a penalty).

In step 108, domains are modelled as sets of points, where each domain is geometrically represented as an n-dimensional sphere such that it (approximately) spans all the n-dimensional points corresponding to instances (i.e., entities/nodes) of the domains. Any instance that falls outside the domain sphere carries a negative cost (i.e., a penalty).

In step 109, subdomains are modelled as sets of points, where each subdomain is geometrically represented as an n-dimensional sphere such that it is (approximately) subsumed by all the n-dimensional spheres corresponding to its parent domain. Any subdomain sphere that falls outside of its sphere of its parent domain carries a negative cost (i.e., a penalty).

In step 110, a range are modelled as sets of points, where each range is geometrically represented as an n-dimensional sphere such that it (approximately) spans all the n-dimensional points corresponding to instances (i.e., entities/nodes) of the ranges. Any instance that falls outside the range sphere carries a negative cost (i.e., a penalty).

In step 111, subranges are modelled as sets of points, where each subrange is geometrically represented as an n-dimensional sphere such that it is (approximately) subsumed by all the n-dimensional spheres corresponding to its parent ranges. Any subrange sphere that falls outside of its sphere of its parent range carries a negative cost (i.e., a penalty).

In step 112, properties are modelled as sets of pairs of points, where each property is geometrically represented as a 2n-dimensional sphere such that it (approximately) spans all the 2n-dimensional points corresponding to instances (i.e., each edge connects two entities/nodes) of the properties. Any instance that falls outside the properties sphere carries a negative cost (i.e., a penalty).

In step 113, sub-properties are modelled as sets of pair of points, where each sub-property is geometrically represented as a 2n-dimensional sphere such that it is (approximately) subsumed by all the 2n-dimensional spheres corresponding to its parent properties. Any sub-property sphere that falls outside of its sphere of its parent property carries a negative cost (i.e., a penalty).

In step 114, a model (i.e., an embedded model) is learned by assigning a position to all n-dimensional and 2n-dimensional points and to all spheres such that it minimizes the negative costs of the n-dimensional points being outside of the corresponding n-dimensional spheres (i.e., minimizing the penalty as defined above).

It is noted that steps 101-113 can preliminarily develop a knowledge base from a graph of finite sets of triples and an ontology where an n-dimensional graph embedding of the knowledge base is a trio of functions in which the trio of functions are learned from the graph embedding in step 114.

For example, the knowledge base is developed in steps 101-113 by considering countably finite sets E of entities, C of classes, and P of relations, such that E, C, and P are pairwise disjoint (letting ECP=E∪C∪P).

It is noted that the special relations type, subClassOf, domain, range, subPropertyOf ∈ are given special meaning (as described later). Also, a triple is a tuple (s, p, o)∈ECP×P×ECP.

A graph D is a finite set of triples such that for every (s, p, o)∈D, it is the case that:
- p∉{subClassOf, domain, range, subPropertyOf},
- if p=type, then s∈E and o∈C,
- if p≠type, then s, o∈E.

For an ontology T to be a finite set of triples such that for every (s, p, o)∈T, it is the case that:
- p∈{subClassOf, domain, range, subPropertyOf}
- if p=subClassOf then s, o∈C,
- if p=domain then s∈P and o∈C,
- if p=range then s∈P and o∈C,
- if p=subPropertyOf then s, o∈P.

Further, a knowledge base K is defined as a pair $K=(D_k, T_k)$, where $D_k$ is a graph and $T_k$ is an ontology. It is noted that the above items are intended to specify a simplified version of the international standard RDF model, Thus, given a knowledge base $K=(D_k, T_k)$, and given an integer $n \in \mathbb{N}$ (the first hyperparameter of the model), an n-dimensional graph embedding of K is a trio of functions $(f_E, f_C, f_P)$ to develop the knowledge base K where:

1. $f_E$ is a function $f_E: E \to \mathbb{R}^n$ which assigns to each entity $e \in E$ an n-dimensional column vector $f_E(e) = \vec{e} = (\vec{e}_{[1]}, \ldots, \vec{e}_{[n]})^T$ called the embedding of e, 2. $f_C$ is a function $f_C: C \to \mathbb{R}^n \times \mathbb{R}^n$ which assigns to each class $c \in C$ a tuple $f_C(e) = (\vec{c}, \rho_e)$, where $\vec{c} = (\vec{c}_{[1]}, \ldots, \vec{s}_{p[n]})^T$ and $\vec{o}_p = (\vec{o}_{p[1]}, \ldots, \vec{o}_{p[n]})^T$ are n-dimensional column vectors which we call the subject centroid of p and the object centroid of p, respectively, and $\rho_p \in \mathbb{R}^n$ is called the radius of p.

The "learning" of step 114 considers that the knowledge base is given from the preliminaries of steps 101-113. That is, given the knowledge base $K=(D_k, T_k)$, an embedding model $(f_E, f_C, f_P)$ of K is obtained in step 114. Variables are defined for each of the components of the vectors and radii defined previously, and a cost function is used to find the most desirable assignment of these variables. That is, it is assumed that elements $E=\{e^1, \ldots, e^u\}$, $C=\{c^1, \ldots, c^v\}$, and $P=\{p^1, \ldots p^w\}$ are enumerated where u=|E|, v=|C|, and w=|P|. It is defined that:

- For each $e^i \in E$ define the variables $e_1^i, \ldots, e_n^i$,
- For each $c^j \in C$ define the variables $c_1^j, \ldots, c_n^i$ and the variable $\rho_c^j$,
- For each $p^k \in R$ define the variables $s_{p,1}^k, \ldots, s_{p,n}^k$, the variables $o_{p,1}^k, \ldots, o_{p,n}^k$, and the variable $\rho_p^k$.

It is noted that there are nu+(n+1)v+(2n+1)w=(u+v+2w)n+(v+w) variables in total. Obtaining an assignment of the variables induces a concrete graph embedding of $(f_E, f_C, f_P)$.

The cost expression $\mathcal{L}$ as a function of the previously defined variables is represented as:

$$\mathcal{L} = \mathcal{L}_{(e_1^1, \ldots, e_n^u; c_1^1, \ldots, c_n^u; \rho_c^1, \ldots, \rho_c^n; s_{p,1}^1, \ldots, s_{p,n}^w; o_{p,1}^1, \ldots, o_{p,n}^w; \rho_p^1, \ldots, \rho_p^n)}$$

The n-dimensional vectors are defined as:

$$\vec{s} = (\vec{s}_{[1]}, \ldots, \vec{s}_{[n]})^T \text{ and } \vec{o} = (\vec{o}_{[1]}, \ldots, \vec{o}_{[n]})^T$$

And, the 2n-dimensional vector is defined as:

$$\vec{s} \oplus \vec{o} = (\vec{s}_{[1]}, \ldots, \vec{s}_{[n]}, \vec{o}_{[1]}, \ldots, \vec{o}_{[n]})^T$$

The n-dimensional vectors and 2n-dimensional vector are used to define a distance between the embeddings of two relations. Give, $p \in P$, in $\mathbb{R}^{n \cdot 2n}$, $\vec{p} = \vec{s}_p \oplus \vec{o}_p$. Also, given two relations p, $q \in P$, the distance $d(\vec{p}, \vec{q})$, is used noting that the distance is defined in $\mathbb{R}^{n \cdot 2n}$.

Thus, the precise from of is $\mathcal{L}$ defined as:

$$\mathcal{L} = \mathcal{L}_{type} + \mathcal{L}_{subClassOf} + \mathcal{L}_{domain} + \mathcal{L}_{range} + \mathcal{L}_{subPropertyOf} + \mathcal{L}_D$$

where:

$$\mathcal{L}_{type} = \sum_{(a,type,c) \in T} rect[rect(d(\vec{a}, \vec{c}) - \rho_c) - rect(d(\vec{a}, \vec{c'}) - \rho_c) - \gamma]$$

$$\mathcal{L}_D = \sum_{(s,p,o) \in D} \sum_{(s',p,o') \in D_{(s,p,o)}} rect[rect(d(\vec{s} \oplus \vec{o}, \vec{p}) - \rho_p) - rect(d(\vec{s'} \oplus \vec{o'}, \vec{p}) - \rho_p) - \gamma]$$

It is noted that each component is specified similar to the above.

And, where rect(x)=max(0,x) and $D_{(s, p, o)}$ is the set of triples corrupted from (s, p, o). The cost function $\mathcal{L}$ can be minimized with a stochastic gradient descent method.

The precise form of the cost function $\mathcal{L}$ is based on classes being modelled as n-spheres in $\mathbb{R}^n$. For a class $c \in C$, in the embedding value $f_C = (\vec{c}, \rho_c)$, $\vec{c}$ represents the center of the n-sphere, and $p_c$ represents its radius. Type assertions, e.g., a triple (a, type, c) for some vector(a)∈E, are given a cost equal to the distance from vector(a) to the surface of the n-sphere corresponding to c, but are not given any cost if the embedding a is within c's n-sphere. In this way, classes also represent sets of entities.

Properties are modelled as 2n-spheres in $\mathbb{R}^{n \cdot 2n}$. For a property p P, in the embedding value $f_P(p) = (\vec{s}_p, \vec{o}_p, \rho_p)$ the 2n-dimensional vector $\vec{s}_p \oplus \vec{o}_p$ represents the center of the 2n-sphere and $p_p$ represents its radius. For a triple (s, p, o)$\in D_K$, for example, the vector $\vec{s}_p \oplus \vec{o}_p \in \mathbb{R}^{n \cdot 2n}$ in produced and the distance is calculated between this point and the surface of the 2n-sphere corresponding to p as the cost. In this way, properties also represent sets of pairs of entities.

In another embodiment, the cost function can include an alternative formulation. The term can be expressed in term $\mathcal{L}_D$ of a distance in $\mathbb{R}^{n \cdot 2n}$ and defined as:

$$\mathcal{L}_D = \sum_{(s,p,o)\in D} [d(\vec{s} \oplus \vec{o}, \vec{p}) - \rho_p]_+$$

When using the standard L2 distance function, the $\mathcal{L}_D$ term can be reformulated. For this, it is noted that for a given (s, p, o)$\in D_K$ that:

$$d(\vec{s} \oplus \vec{o}, \vec{p})^2 = d(\vec{s} \oplus \vec{o}, \vec{s}_p \oplus \vec{o}_p)^2 = d((\vec{s}_{[1]}, \ldots \vec{s}_{[n]}, \vec{o}_{[1]}, \ldots \vec{o}_{[n]}),$$
$$(\vec{s}_{p[1]}, \ldots \vec{s}_{p[n]}, \vec{o}_{p[1]}, \ldots \vec{o}_{p[n]}))^2$$
$$= [(\vec{s}_{[1]} - \vec{s}_{p[1]})^2 + \ldots + (\vec{s}_{[n]} - \vec{s}_{p[n]})^2 + (\vec{o}_{[1]} - \vec{s}_{p[1]})^2 + \ldots +$$
$$(\vec{o}_{[n]} - \vec{o}_{p[n]})^2]$$
$$= d(\vec{s}, \vec{s}_p)^2 + d(\vec{o}, \vec{o}_p)^2$$

As such, the alternative cost term can be defined for facts as:

$$\mathcal{L}'_D = \sum_{(s,p,o)\in D} [d(\vec{s} \oplus \vec{o}, \vec{p})^2 - \rho_p^2]_+$$
$$= \sum_{(s,p,o)\in D} [d(\vec{s}, \vec{s}_p)^2 + d(\vec{o}, \vec{o}_p)^2 - \rho_p^2]_+$$

Thus, in the invention, a new embedding model is developed using a geometrical set-centric approach to capture both an ABox and a TBox representational model. Thereby, with the invention, a semantic-rich knowledge graph can be transformed into a set of overlapping, disjoint, and/or subsumed n-dimensional spheres that capture and represent semantics embedded in a knowledge graph.

Figure 2:
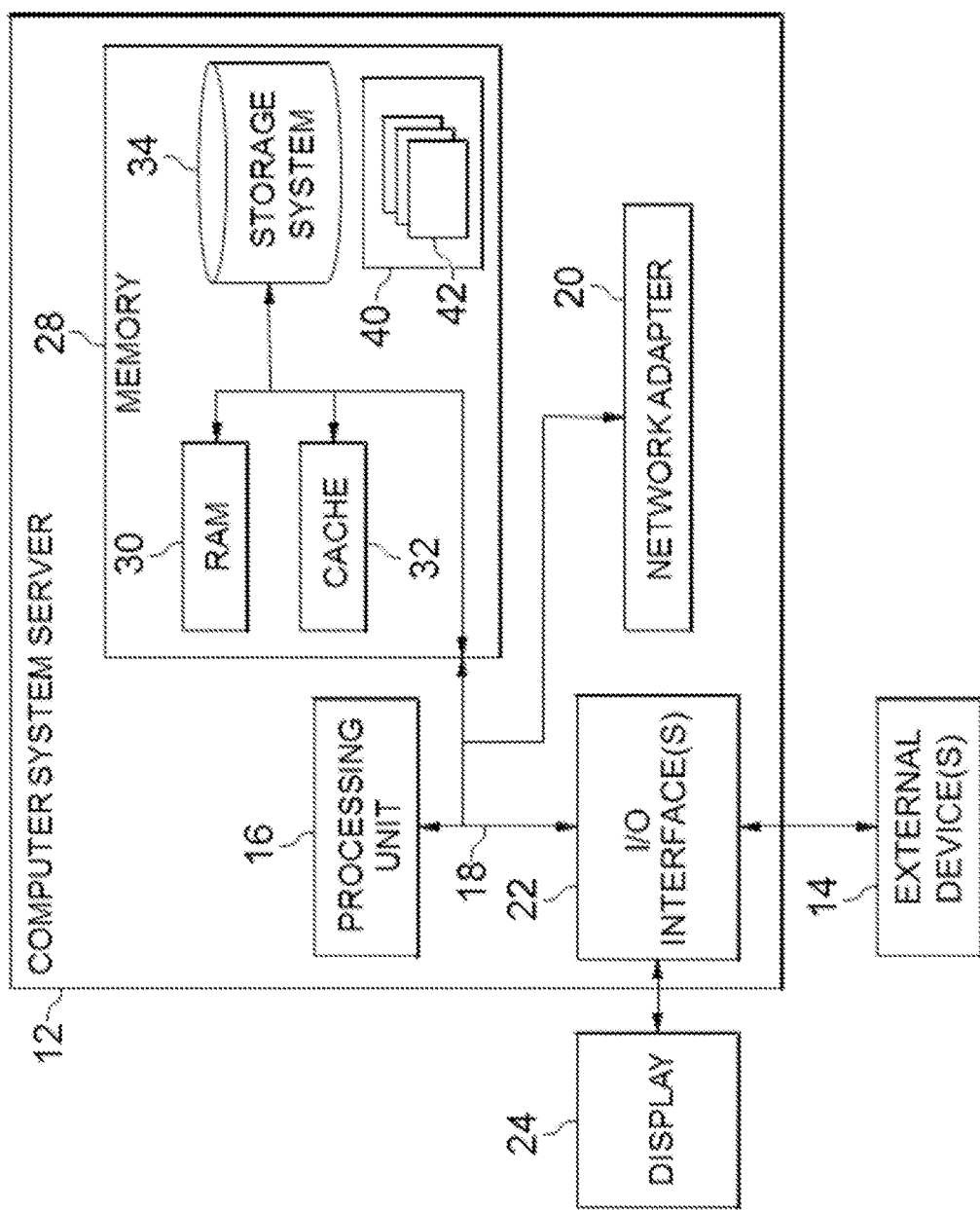
FIG. 2 depicts an example of a system according to an embodiment of the present invention.

FIG. 2 depicts an exemplary computer system 12 according to one or more embodiments of the present invention. By way of overview, system 12 can includes a processing unit 16 that is operably coupled to memory 28. Memory 28 can include computer readable/executable program instructions (aka software) stored in storage system 34. In some embodiments, the software is configured to perform the steps of FIG. 1 when executed by processing unit 16.

Figure 3:
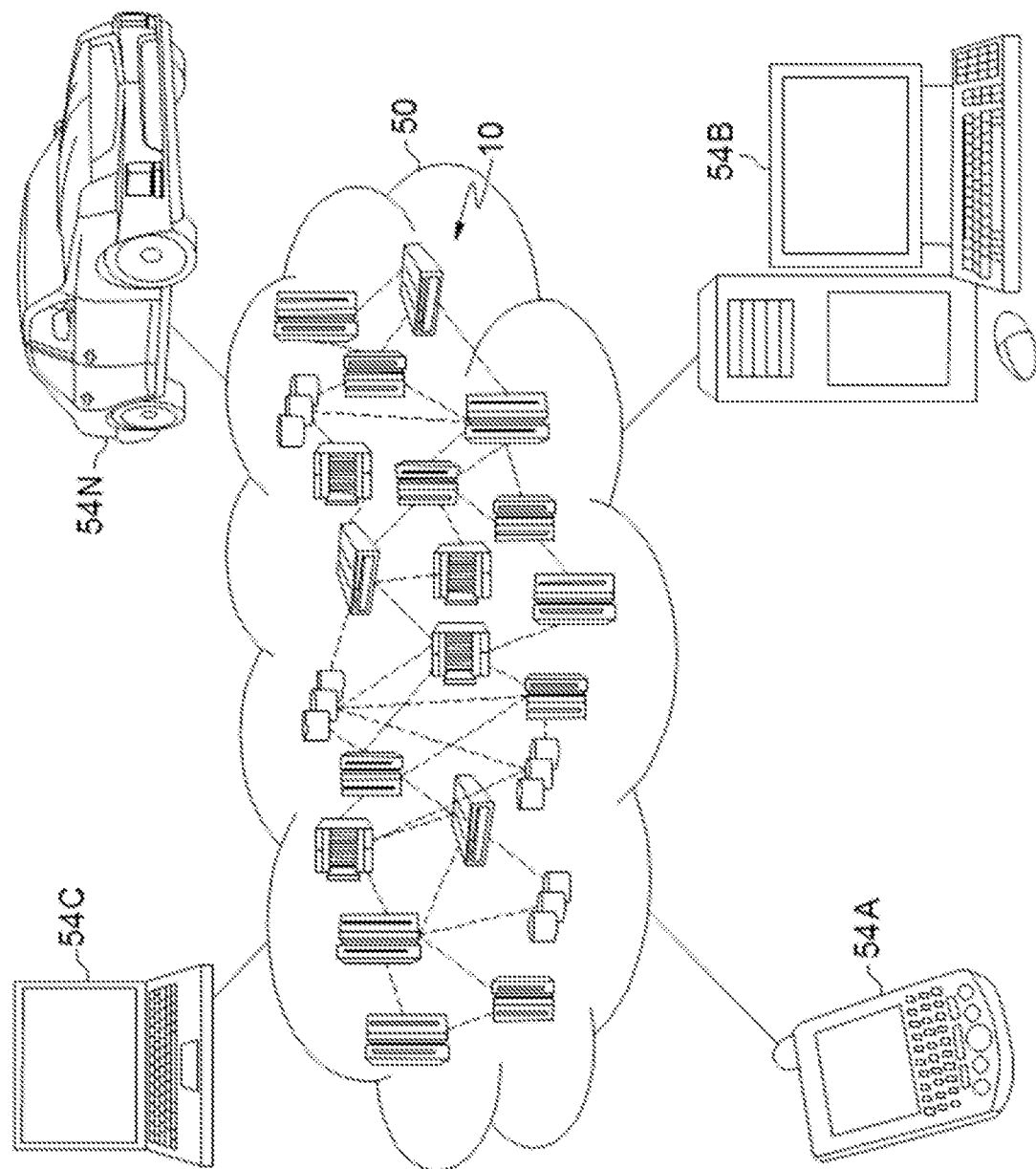
FIG. 3 depicts a cloud computing environment according to an embodiment of the present invention.

As will described/illustrated in more detail below with reference to the examples depicted in FIG. 3 and FIG. 4, one or more embodiments of the present invention may be implemented in a cloud environment.

Referring now specifically to FIG. 2, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring again to FIG. 2 and FIG. 3, the figures depict an example cloud computing environment 50. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
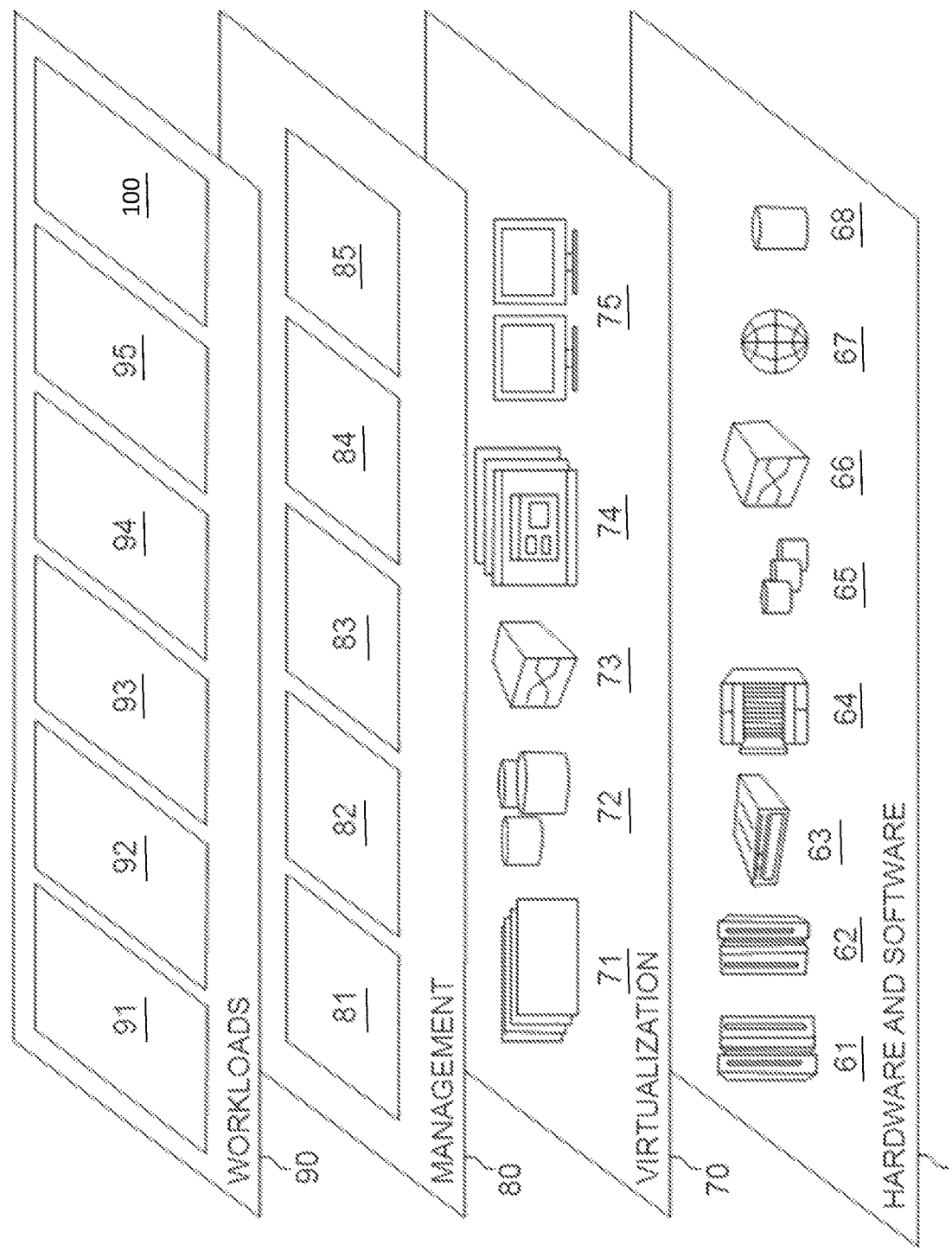
FIG. 4 depicts abstraction model layers according to an embodiment of the present invention.

Referring now to FIG. 4, an exemplary set of functional abstraction layers provided by cloud computing environment 50 (FIG. 4) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a semantic embedding method 100 (FIG. 1), in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method, comprising:
   in a preliminary phase, transforming a knowledge graph into a set of n-dimensional spheres and 2n-dimensional spheres to represent semantics embedded in the knowledge graph;
   assigning a position to the n-dimensional points in the n-dimensional spheres and to the 2n-dimensional points in the 2n-dimensional spheres to a model, such that the model reflects assigned n-dimensional points; and
   in the preliminary phase, modelling entities and nodes as points in n-dimensional space,
   wherein said modelling further comprises, in the preliminary phase, modelling classes, types, ranges, and domains as sets of points forming the n-dimensional spheres,
   wherein said modelling further comprises, in the preliminary phase, modelling relations and properties as sets of pairs of points forming the 2n-dimensional spheres,
   wherein said modelling further comprises modelling, in the preliminary phase, the classes as the sets of points, and geometrically representing a class as an n-dimensional sphere such that the n-dimensional sphere spans all n-dimensional points corresponding to instances of the classes, and any instance that falls outside a class sphere carries a negative cost, and
   wherein, said modelling further comprises modelling in the preliminary phase, subclasses as sets of points where a subclass is geometrically represented as an n-dimensional sphere such that the subclass is subsumed by all of the n-dimensional spheres corresponding to parent classes of the subclasses, and any n-dimensional sphere representing the subclass that falls outside of the n-dimensional sphere of a corresponding parent class carries a negative cost,
   further comprising leveraging the knowledge graph a prediction task,
   further comprising utilizing a cost function that associates a negative cost with each occurrence of a position of the 2n-dimensional spheres being overlapping with or disjoint from the n-dimensional spheres,
   wherein the model is developed using a geometrical set-centric approach to capture both an ABox and a TBox representational model,
   wherein, with the ABox and the TBox representational model, the knowledge graph is transformed into a set of disjoint n-dimensional spheres that capture and represent semantics embedded in the knowledge graph, and
   wherein the model is learned by assigning a position to all the n-dimensional points and the 2n-dimensional points and to all spheres such that the position minimizes the negative costs of the n-dimensional points being outside of the corresponding n-dimensional spheres.

2. The computer-implemented method of claim 1, said modelling further comprising modelling, in the preliminary phase, when the types as sets of points, wherein a type is geometrically represented as an n-dimensional sphere such that the n-dimensional sphere spans the n-dimensional points corresponding to instances of the types, and any instance that falls outside the n-dimensional sphere representing the types carries a negative cost.

3. The computer-implemented method of claim 2, wherein, said modelling further comprising modelling, in the preliminary phase, subtypes sets of points wherein a subtype is geometrically represented as an n-dimensional sphere such that the n-dimensional sphere is subsumed by all the n-dimensional spheres corresponding to parent types, and any n-dimensional sphere representing the subtype that falls outside of the n-dimensional sphere of its parent type carries a negative cost.

4. The computer-implemented method of claim 1, said modelling further comprising modelling, in the preliminary phase, when the domains as sets of points, wherein a domain is geometrically represented as an n-dimensional sphere such that the n-dimensional sphere spans the n-dimensional points corresponding to instances of the domains, and any instance that falls outside the n-dimensional sphere representing the domain carries a negative cost.

5. The computer-implemented method of claim 4, said modelling further comprising modelling, in the preliminary phase, subdomains as sets of points, wherein a subdomain is geometrically represented as an n-dimensional sphere such that the n-dimensional sphere is subsumed by the n-dimensional spheres corresponding to its parent domain, and any subdomain sphere that falls outside of its sphere of its parent domain carries a negative cost.

6. The computer-implemented method of claim 1, said modelling further comprising modelling, in the preliminary phase, ranges as sets of points, wherein a range is geometrically represented as an n-dimensional sphere such that the n-dimensional sphere spans the n-dimensional points corresponding to instances of the ranges, and any instance that falls outside the n-dimensional sphere representing the ranges carries a negative cost, said modelling further comprising modelling, in the preliminary phase, subranges as sets of points, where each subrange is geometrically represented as an n-dimensional sphere such that the n-dimensional sphere is subsumed by all the n-dimensional spheres corresponding to its parent ranges, and any n-dimensional sphere representing the subranges that falls outside of the spheres of its parent range carries a negative cost, said modelling further comprising, modelling, in the preliminary phase, properties as sets of pairs of points, each property is geometrically represented as a 2n-dimensional sphere such that the 2n-dimensional sphere spans all of the 2n-dimensional points corresponding to each edge that connects two entities and/or nodes of the properties, and any edge that connects two entities and/or nodes of the properties that falls outside the 2n-dimensional sphere representing the properties carries a negative cost, and said modelling further comprising modelling, in the preliminary phase, sub-properties as sets of pair of points, wherein a sub-property is geometrically represented as a 2n-dimensional sphere such that the 2n-dimensional sphere is subsumed by the 2n-dimensional spheres corresponding to its parent properties, and any 2n-dimensional sphere representing the sub-properties that falls outside of its parent property carries a negative cost.

7. The computer-implemented method of claim 1, embodied in a cloud-computing environment.

8. A computer program product for semantic embedding, comprising a computer readable storage medium having program instructions embodied therewith, the program instructions executable by a computer to cause the computer to perform:

in a preliminary phase, transforming a knowledge graph into a set of n-dimensional spheres and 2n-dimensional spheres to represent semantics embedded in the knowledge graph;

assigning a position to the n-dimensional points in the n-dimensional spheres and to the 2n-dimensional points in the 2n-dimensional spheres to a model, such that the model reflects assigned n-dimensional points; and in the preliminary phase, modelling entities and nodes as points in n-dimensional space, wherein said modelling further comprises, in the preliminary phase, modelling classes, types, ranges, and domains as sets of points forming the n-dimensional spheres, wherein said modelling further comprises, in the preliminary phase, modelling relations and properties as sets of pairs of points forming the 2n-dimensional spheres, wherein said modelling further comprises modelling, in the preliminary phase, the classes as the sets of points, and geometrically representing a class as an n-dimensional sphere such that the n-dimensional sphere spans all n-dimensional points corresponding to instances of the classes, and any instance that falls outside a class sphere carries a negative cost, and wherein, said modelling further comprises modelling in the preliminary phase, subclasses as sets of points where a subclass is geometrically represented as an n-dimensional sphere such that the subclass is subsumed by all of the n-dimensional spheres corresponding to parent classes of the subclasses, and any n-dimensional sphere representing the subclass that falls outside of the n-dimensional sphere of a corresponding parent class carries a negative cost, further comprising leveraging the knowledge graph a prediction task, further comprising utilizing a cost function that associates a negative cost with each occurrence of a position of the 2n-dimensional spheres being overlapping with or disjoint from the n-dimensional spheres, wherein the model is developed using a geometrical set-centric approach to capture both an ABox and a TBox representational model, wherein, with the ABox and the TBox representational model, the knowledge graph is transformed into a set of disjoint n-dimensional spheres that capture and represent semantics embedded in the knowledge graph, and wherein the model is learned by assigning a position to all the n-dimensional points and the 2n-dimensional points and to all spheres such that the position minimizes the negative costs of the n-dimensional points being outside of the corresponding n-dimensional spheres.

9. A semantic embedding system, comprising:

a processor; and a memory operably coupled to the processor, the memory storing instructions to cause the processor to perform:

in a preliminary phase, transforming a knowledge graph into a set of n-dimensional spheres and 2n-dimensional spheres to represent semantics embedded in the knowledge graph;

assigning a position to the n-dimensional points in the n-dimensional spheres and to the 2n-dimensional points in the 2n-dimensional spheres to a model, such that the model reflects assigned n-dimensional points; and in the preliminary phase, modelling entities and nodes as points in n-dimensional space, wherein said modelling further comprises, in the preliminary phase, modelling classes, types, ranges, and domains as sets of points forming the n-dimensional spheres, wherein said modelling further comprises, in the preliminary phase, modelling relations and properties as sets of pairs of points forming the 2n-dimensional spheres, wherein said modelling further comprises modelling, in the preliminary phase, the classes as the sets of points, and geometrically representing a class as an n-dimensional sphere such that the n-dimensional sphere spans all n-dimensional points corresponding to instances of the classes, and any instance that falls outside a class sphere carries a negative cost, and wherein, said modelling further comprises modelling in the preliminary phase, subclasses as sets of points where a subclass is geometrically represented as an n-dimensional sphere such that the subclass is subsumed by all of the n-dimensional spheres corresponding to parent classes of the subclasses, and any n-dimensional sphere representing the subclass that falls outside of the n-dimensional sphere of a corresponding parent class carries a negative cost, further comprising leveraging the knowledge graph a prediction task, further comprising utilizing a cost function that associates a negative cost with each occurrence of a position of the 2n-dimensional spheres being overlapping with or disjoint from the n-dimensional spheres,
wherein the model is developed using a geometrical set-centric approach to capture both an ABox and a TBox representational model,
wherein, with the ABox and the TBox representational model, the knowledge graph is transformed into a set of disjoint n-dimensional spheres that capture and represent semantics embedded in the knowledge graph, and
wherein the model is learned by assigning a position to all the n-dimensional points and the 2n-dimensional points and to all spheres such that the position minimizes the negative costs of the n-dimensional points being outside of the corresponding n-dimensional spheres.

10. The system of claim 9, embodied in a cloud-computing environment.

11. The computer program product of claim 8, said modelling further comprising modelling, in the preliminary phase, when the types as sets of points, wherein a type is geometrically represented as an n-dimensional sphere such that the n-dimensional sphere spans the n-dimensional points corresponding to instances of the types, and any instance that falls outside the n-dimensional sphere representing the types carries a negative cost.

12. The computer program product of claim 11, wherein, said modelling further comprising modelling, in the preliminary phase, subtypes sets of points wherein a subtype is geometrically represented as an n-dimensional sphere such that the n-dimensional sphere is subsumed by all the n-dimensional spheres corresponding to parent types, and any n-dimensional sphere representing the subtype that falls outside of the n-dimensional sphere of its parent type carries a negative cost.

13. The computer program product of claim 8, said modelling further comprising modelling, in the preliminary phase, when the domains as sets of points, wherein a domain is geometrically represented as an n-dimensional sphere such that the n-dimensional sphere spans the n-dimensional points corresponding to instances of the domains, and any instance that falls outside the n-dimensional sphere representing the domain carries a negative cost.

14. The computer program product of claim 13, said modelling further comprising modelling, in the preliminary phase, subdomains as sets of points, wherein a subdomain is geometrically represented as an n-dimensional sphere such that the n-dimensional sphere is subsumed by the n-dimensional spheres corresponding to its parent domain, and any subdomain sphere that falls outside of its sphere of its parent domain carries a negative cost.

* * * * *